United States Patent
Popescu-Stanesti et al.

(10) Patent No.: US 7,615,965 B2
(45) Date of Patent: Nov. 10, 2009

(54) POWER MANAGEMENT SYSTEM

(75) Inventors: Vlad Mihail Popescu-Stanesti, San Jose, CA (US); Jiwei Chen, Santa Clara, CA (US); Oleg Kobildjanov, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 308 days.

(21) Appl. No.: 10/928,285

(22) Filed: Aug. 27, 2004

(65) Prior Publication Data

US 2005/0253560 A1    Nov. 17, 2005

Related U.S. Application Data

(60) Provisional application No. 60/571,176, filed on May 14, 2004.

(51) Int. Cl.
*H02J 7/00* (2006.01)
(52) U.S. Cl. .................. 320/128; 320/106; 320/138; 307/46; 307/66
(58) Field of Classification Search ............ 320/106, 320/116, 119, 128, 126, 138; 307/66, 46
See application file for complete search history.

(56) References Cited

U.S. PATENT DOCUMENTS

| 5,422,558 | A  | * | 6/1995  | Stewart ............... 320/120 |
| 5,929,602 | A  | * | 7/1999  | Suzuki ................ 320/116 |
| 5,963,010 | A  | * | 10/1999 | Hayashi et al. ........ 320/106 |
| 6,127,804 | A  | * | 10/2000 | Oglesbee et al. ....... 320/125 |
| 6,184,660 | B1 | * | 2/2001  | Hatular ............... 320/141 |
| 6,326,771 | B1 | * | 12/2001 | Popescu-Stanesti ..... 320/139 |
| 6,879,134 | B2 | * | 4/2005  | Stanesti et al. ....... 320/135 |
| 7,339,353 | B1 | * | 3/2008  | Masias et al. ......... 320/138 |
| 7,352,087 | B2 | * | 4/2008  | Nguyen et al. ......... 307/150 |
| 2001/0054878 | A1 | * | 12/2001 | Odaohhara ............ 320/118 |

* cited by examiner

*Primary Examiner*—Edward Tso
*Assistant Examiner*—Samuel Berhanu (57) ABSTRACT

A method according to one embodiment may include selecting at least one power supply, among a plurality of different power supplies, and coupling at least one available power supply to a load. The method may also include selecting at least one charging mode, among a plurality of different charging modes, to charge a rechargeable battery. Of course, many alternatives, variations, and modifications are possible without departing from this embodiment.

24 Claims, 7 Drawing Sheets

POWER MANAGEMENT SYSTEM

This application claims priority to U.S. Provisional Application Ser. No. 60/571,176, filed May 14, 2004, the teachings of which are hereby incorporated by reference in their entirety.

FIELD

The present disclosure relates to a power management system.

BACKGROUND

The increasing popularity of portable electronic devices, such as notebook computers, mobile phones, digital still cameras and camcorders, has caused an increasing demand for rechargeable batteries, which include, but are not limited to, nickel-cadmium, nickel-metal hydride, lithium-ion, and lithium-polymer batteries.

It may be desirable for the portable electronic devices to be in-field rechargeable, which means that a battery can be recharged without removing the battery from a device or affecting the normal function of a device. When the external power source charges the battery and powers the system simultaneously, the charging current should be adjusted automatically to fulfill first the current requirement of the system.

There are two types of charging methods. One is switching mode, where the battery is charged through a periodically on/off switch. The other one is linear mode, where the battery is charged through a variable resistor. Switching mode charging has higher efficiency, but introduces more switching noise into the system due to the generation and use of an oscillation signal. In contrast, linear mode charging is cleaner at the cost of higher power dissipation.

Different devices may require different charging modes, or the same devices may require different charging modes under different conditions. Thus it is desirable to have a dual mode battery charger for portable electronic devices, and it should be configurable according to user requirements.

Different types of rechargeable batteries may require different charging phases under different conditions. For example, for a deeply discharged battery, a small wake-up charging current may be required to revive it. For a normally discharged battery, a large charging current may be required to achieve the highest charging speed. For an almost full battery, a tapering charging current may be required to keep the battery voltage at a constant level.

If the battery requires a large charging current to maximize the charging speed, a soft-start function may be desired to prevent a big inrush current flowing into the battery, which is realized by gradually increasing the charging current to its full scale.

A portable electronic device may be powered by multiple power sources, such as batteries, high power supplies, and restricted power supplies, which may be perturbed when the drawing current exceeds the predetermined maximum rating current. The high power supplies have the highest priority, the restricted power supplies have a medium priority, and the batteries have the lowest priority. If one of the high power supplies is present, it should charge the battery and power the system, regardless the presence of the restricted power supplies or batteries. If all of the high power supplies are not available and one of the restricted power supplies is available, this restricted power supply should be connected to the system power line using a soft-start procedure to limit the inrush current below its predetermined maximum rating current. When an over-current event occurs, the power input of the system should be switched from the restricted power supply to one of the batteries. Moreover, during any switching procedure, the system power integrity should be assured.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
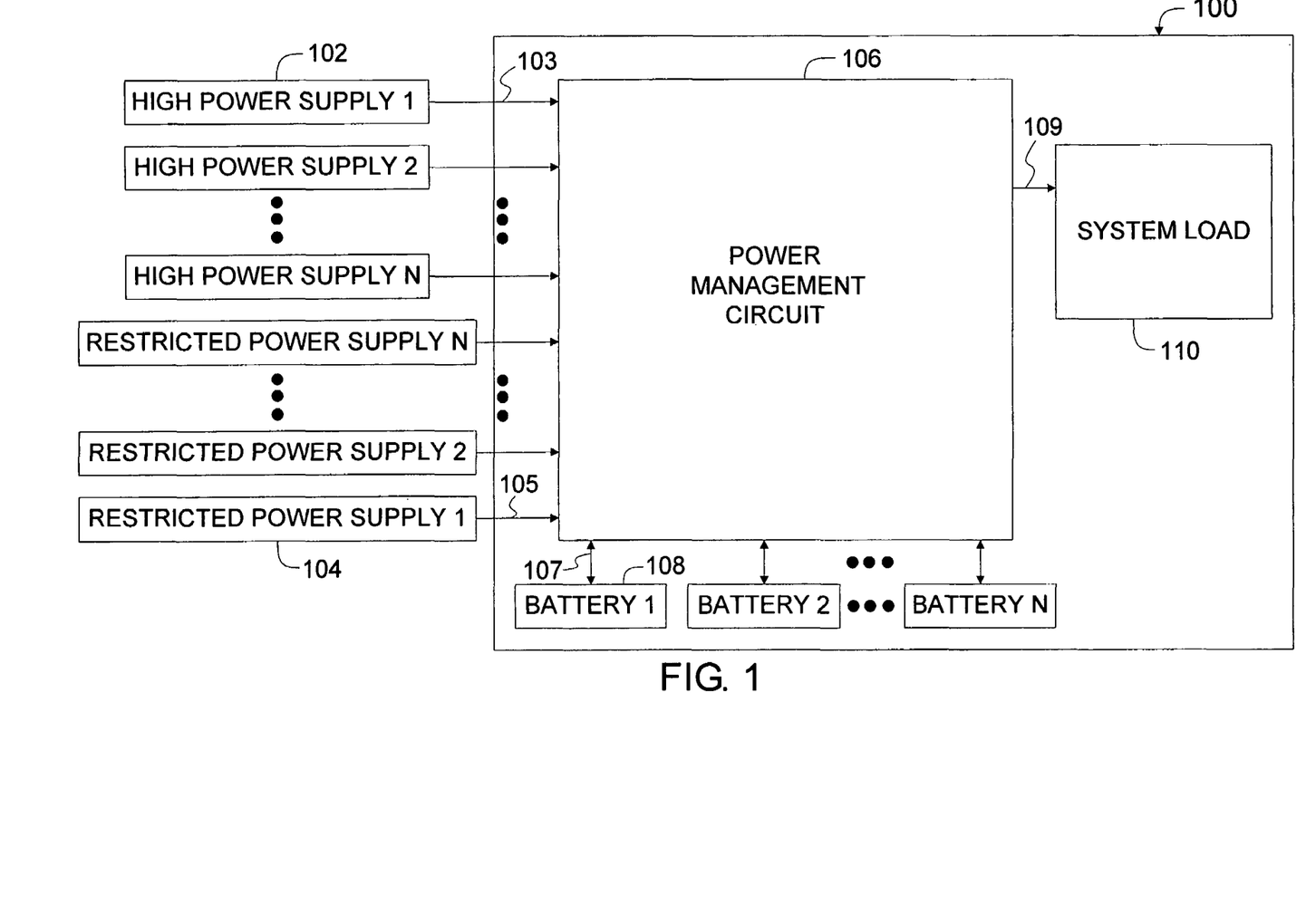
FIG. 1 is a diagram illustrating an exemplary system embodiment.

FIG. 1 depicts a diagram illustrating an exemplary system embodiment. The system may comprise a portable electronic device 100 having multiple power inputs 102, 104 and comprising power management circuitry 106. The portable electronic device 100 may comprise, for example, a laptop computer, a portable phone, a digital still camera, a digital movie camera and/or other electronic device. The device 100 may utilize and/or control a plurality of different power supplies, for example one or more high power supplies 102 and/or one or more restricted power supplies 104.

System 100 may also include one or more rechargeable and/or non-rechargeable batteries 108, a system load 110, and power management circuitry 106 capable of managing power between one or more power supplies, one or more batteries and the system load. "High power supply", as used herein, may be defined as a power supply capable of delivering an instantaneous power to a load. For example, one or more high power supplies 102 may be capable of providing at least the maximum instantaneous power that may be required by the system load 110. A specific example of a high power supply may include an AC adapter or a car adapter. "Restricted power supply", as used herein, may be defined as a power supply capable of delivering a restricted power to a load. For example, one or more restricted power supplies 104 may be capable of delivering limited power to a load. Other exemplary restrictions may include a soft hand-shake with the system 100, tight over-current conditions, and/or timing restrictions. A specific example of a restricted power supply includes the power line of universal serial bus (USB) port, which can provide 100 mA current (for low power USB hub port) or 500 mA current (for high power USB hub port) and needs a preliminary communication between itself and the system to set the conditions. Another specific example of a restricted power supply includes a "Fire-Wire" interface. Although USB and Fire-Wire may represent examples of a restricted power supply, it should be understood that the restricted power supply 104 should not be limited only to USB or Fire-Wire ports, but it should include any existing and/or new and/or emerging interfaces or power supplies.

Batteries 108 may comprise any type of battery, for example, a rechargeable battery comprising nickel-cadmium, nickel-metal hydride, lithium-ion, and lithium-polymer. These batteries may have a single cell or multiple cells. The system load 110 may include an active electronic circuit which consumes current. System load 110 may include one or more discrete components, chips, and/or electronic system. It may also be partially or totally integrated with the power management circuit 106 in some applications.

Figure 2:
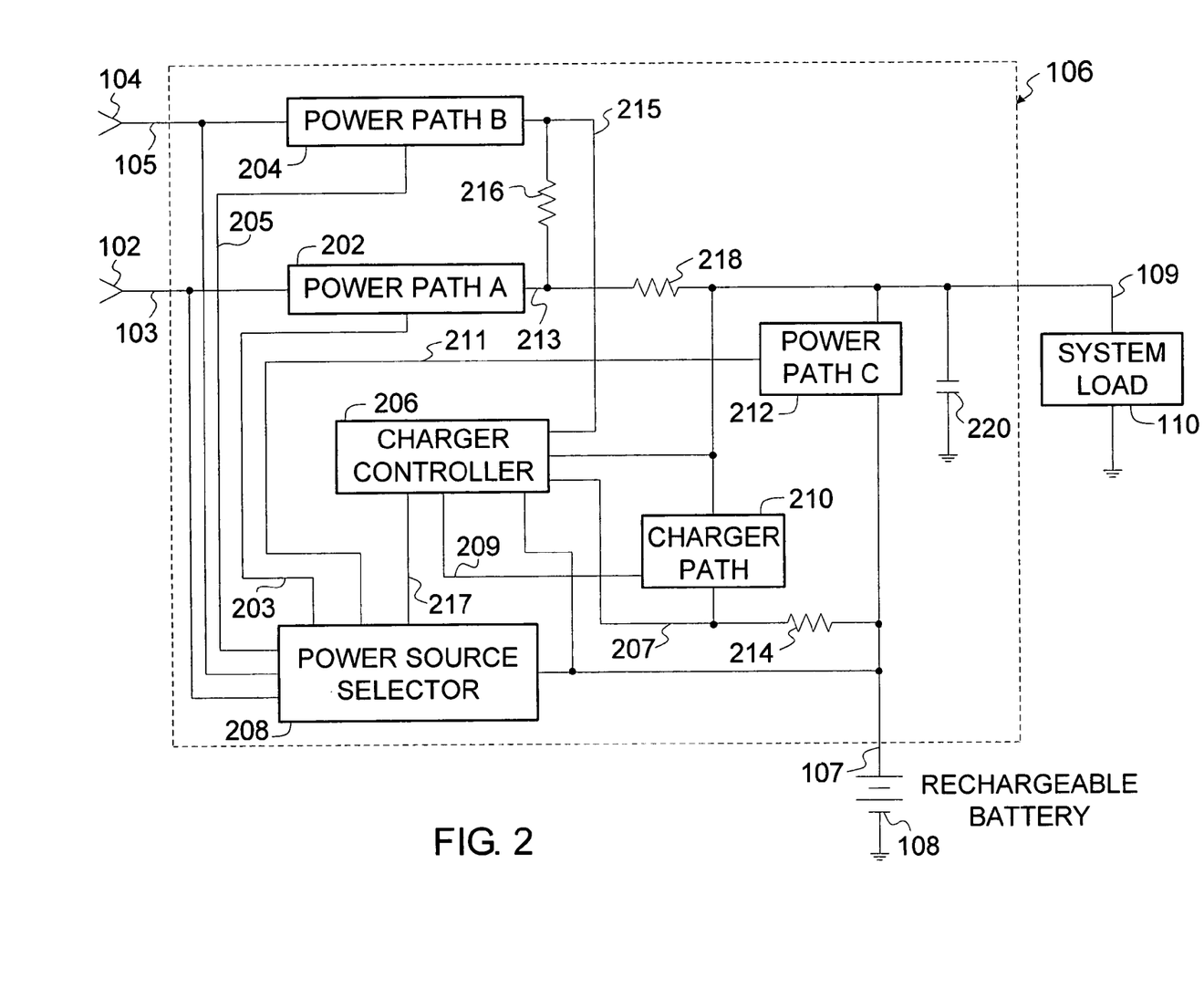
FIG. 2 is a diagram illustrating exemplary power management circuitry.

Turning to FIG. 2, an exemplary block diagram of power management circuitry 106 is depicted. As used in any embodiment herein, "circuitry" may comprise, for example, singly or in any combination, hardwired circuitry, programmable circuitry, state machine circuitry, and/or firmware that stores instructions executed by programmable circuitry. Power management circuitry 106 may comprise discrete components, or may be embodied as an integrated circuit. "Integrated circuit", as used in any embodiment herein, may mean a semiconductor device and/or microelectronic device, such as, for example, a semiconductor integrated circuit chip. In FIG. 2, certain portions of the system 100 depicted in FIG. 1 have been omitted for clarity (for multiple power supplies and batteries), but it is to be understood that like parts of FIG. 2 can be implemented in a manner consistent with an embodiment depicted in FIG. 1, or alternatively in other system implementations, without departing from this embodiment.

Power management circuitry 106 (and/or system 100) may also comprise memory (not shown). Memory may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory may comprise other and/or later-developed types of computer-readable memory. Machine-readable firmware program instructions and/or operation parameters may be stored in memory. As described below, these instructions and/or operational parameters may be accessed and executed by power management circuitry 106 generally to perform operations as may be described herein.

As an overview, power management circuitry 106 may be capable of, at least in part, selecting at least one power supply among a plurality of different power supplies and coupling at least one selected power supply to a load. Power management circuitry 106 may also be capable of charging at least one rechargeable battery using at least one available power supply. In exemplary embodiments described herein, power management circuitry 106 may also be capable selecting at least one power supply among a plurality of different power supplies and coupling at least one available power supply to a load and at least one rechargeable battery. Power management circuitry 106 may also be capable of selecting a charging mode, among a plurality of charging modes, to charge a rechargeable battery, and/or selecting a charging phase, among a plurality of charging phases, to charge a rechargeable battery.

Power management circuitry 106 may comprise a plurality of power paths 202, 204, 212, charger controller circuitry 206, and power source selector circuitry 208. As will be detailed below, power source selector circuitry 208 may be capable of controlling the conduction state of one or more power paths 202, 204, and/or 212 to deliver power to the load 110, to one or more rechargeable batteries 108, or both. Power path A 202 may conduct power to the system load 110 and/or to the charger path 210 (via node 109) when one or more high power supplies 102 is available. Power path A 202 may be turned off when one or more high power supplies 102 are OFF (unavailable) to prevent reverse current flowing into the high power supply 102.

Similarly, power path B 204 may conduct power to the system load 110 and to the Charger path 210 via node 109 when one or more restricted power supplies 104 are present. Restrictions associated with power supply 104 may be stored in memory in power source selector 208. As an example, one restriction may be that the total current drawn out of the restricted power supply 104 is below a preset maximum value. Power path B 204 may also perform a soft-start procedure to prevent inrush current event when power supply 104 is plugged in. Power path B 204 may be turned off to prevent current flowing into the restricted power supply 104 when it is not present, not ON, not approved to be used, or the high power supply 102 is also present. During the on state of power path B 204, if the total current, drawn by the system load 110 and the rechargeable battery 108 exceeds the limit of the restricted power supply 104, or any other restriction is violated (or new restriction is imposed), power path B 204 may be switched off immediately to protect the restricted power supply 104.

If power path B 204 is switched off, power path C 212 may be turned on to continue powering the system load 110 and to keep the power integrity on the system power line 109. If neither the high power supply 102 nor the restricted power supply 104 is present, or when the high power supply 102 is not present, and the Power path B 204 is turned OFF for any reason, the system load 110 may be powered by the battery 108 through the conducting power path C 212. Capacitor 220 could be used to maintain the power integrity on the system power line 109 during the switching procedure from one power supply to another.

Resistors 218 and 216 may be used to sense the current of the high power supply 102 or the restricted power supply 104. When the high power supply 102 is powering the system, power path B 204 may be off, and there may be no current flowing through resistor 216. Thus, the voltages at node 213 and node 215 may be approximately equal, and the voltage drop between node 215 and node 109 may be approximately equal to the total current flowing out of the high power supply 102 times the resistance of resistor 218. When one or more restricted power supplies 104 are powering the system, power path A 202 may be off with no current flowing through it, so the voltage drop between node 215 and node 109 may be approximately equal to the total current flowing out of the restricted power supply 104 times the total resistances of resistor 218 and 216. In other words, in any case, the voltage drop between node 215 and node 109 may be proportional to the corresponding input current of either the high power supply 102 or the restricted power supply 104. It is to be understood that other current sensing devices may be used instead of resistors, for example, Hall sensors, solid state sensors, and/or integrated sensors into the corresponding power path.

The battery may be charged from one or more high power supplies 102 and/or one or more restricted power supplies 104, via charger path 210. The charging current flows from node 109 into the charge path 210, and then flows out to node 207. Charger path 210 may be controlled by a control signal generated by charger controller 206, at node 209. As will be detailed below, the control signal may include a periodic on/off signal for switch mode charging of a rechargeable battery, and/or an analog signal for linear mode charging of a rechargeable battery. Resistor 214 may be used to sense the charging current into the battery 108. It is to be understood that other current sensing devices may be used instead of resistors, for example, Hall sensors, solid state sensors, and/or integrated sensors and/or other types of sensors that may be considered equivalent.

Charger controller 206 may be capable of determining the availability of at least one power supply and coupling, at least in part, at least one available power supply to a rechargeable battery. To that end, charger controller circuitry 206 may be capable of receiving the input current information via node 215 and node 109, the charging current information via node 207 and node 107, and the battery voltage information via node 107. In response to one or more of these inputs, charger controller circuitry 206 may be capable of generating charging control signal (at node 209) which may operate to couple a rechargeable battery to at least one available power supply, in a manner which will be described in detail below. Charger controller circuitry 206 may also be capable of communicating commands and data to power source selector circuitry 208, via communication link 217.

Power source selector circuitry 208 may be capable of determining which power source should be used to power the system load 110. For example, circuitry 208 may receive the information of the three kinds of power sources at node 103, node 105 and node 107 respectively, and the corresponding current information from the charger controller circuitry 206 (via link 217). In response thereto, circuitry 208 may generate control signals at node 203, node 205 and node 211 to control the conduction state (i.e., ON or OFF) of power paths A 202, B 204 and C 212, respectively.

Figure 3:
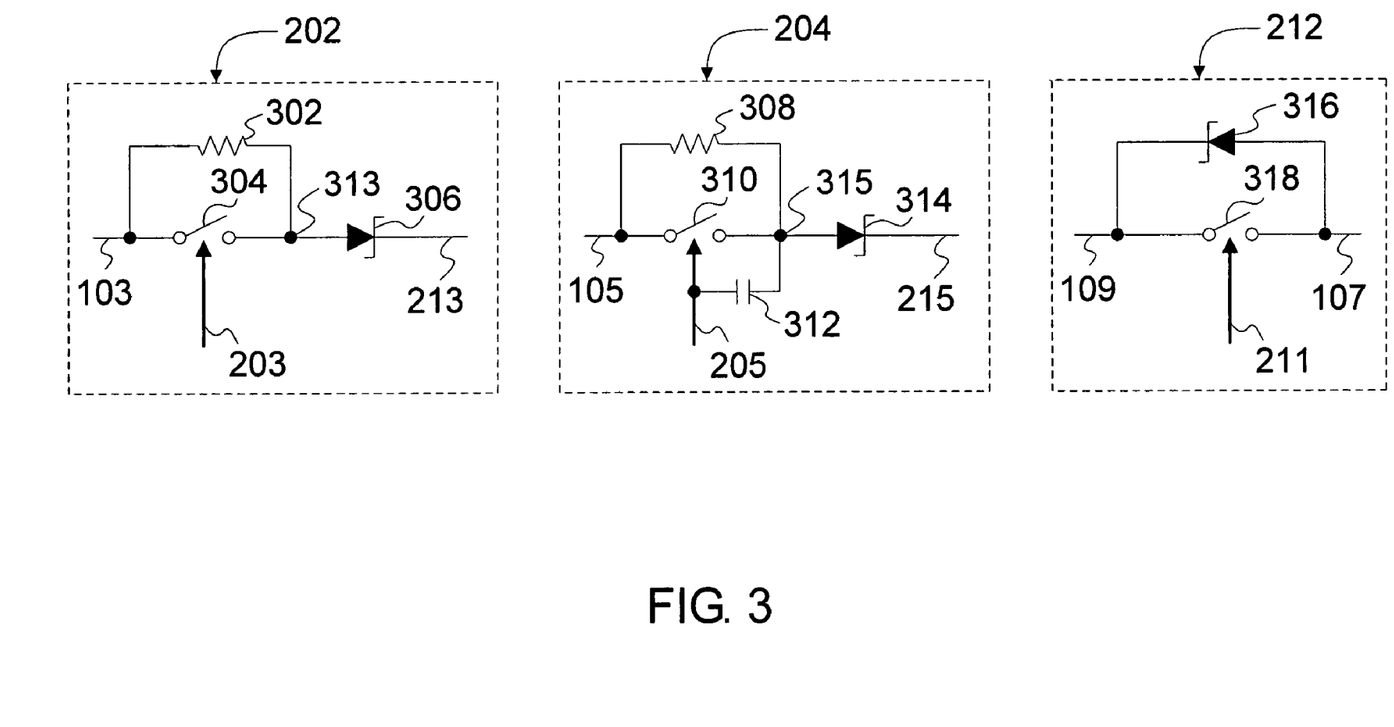
FIG. 3 is a diagram illustrating exemplary power path circuitry.

The schematic representation of one set of embodiments of the three types of power paths according to the present invention is shown in FIG. 3. Power path A 202 may comprise of a resistor 302 between node 103 and node 313, a voltage controlled switch 304 between node 103 and node 313, and a diode 306 with its anode connected to node 313 and cathode connected to node 213. Diode 306 may prevent the reverse current flowing from the system into the high power supply 102, and it may be a general semiconductor diode, or a Schottky diode with reduced forward voltage drop, or any other devices configured to have a typical characteristic of a diode. Resistor 302 may provide a weak conducting path from the node 103 up to the system via diode 306 to power the whole system up, and its resistance sets a safe current limit for the high power supply 102 at the very beginning time of its plug-in. Voltage controlled switch 304 is in parallel with resistor 302, and it receives a controlling signal at node 203 to provide a very high resistance path in off state and a very low resistance path in on state from node 103 to node 313.

Power path B 204 may comprise of a resistor 308 between node 105 and node 315, a voltage controlled switch 310 between node 105 and node 315, a capacitor 312 between node 205 and node 315, and a diode 314 with its anode connected to node 315 and cathode connected to node 215. Diode 314 may prevent the reverse current flowing from the system into the restricted power supply 104, and it may be a general semiconductor diode, or a Schottky diode with reduced forward voltage drop, or any other devices configured to have a typical characteristic of a diode. Resistor 308 may provide a weak conducting path from node 105 to the system via diode 314 to power the whole system up, and its resistance sets a safe current limit for the restricted power supply 104 at the very beginning time of its plug-in. Voltage controller switch 310 is in parallel with resistor 308, and it receives a controlling signal at node 205, which controls its own resistance to limit the current from the restricted power supply during the transient, and to provide a very high resistance path in off state and a very low resistance path in fully on state from node 105 to node 315. Capacitor 312 could be used if necessary to guarantee the slow change of the voltage at node 205 in the soft-start procedure and to keep the power integrity when the power is switched from battery to this restricted power supply 104. In some cases, an additional capacitor can be connected between node 105 and node 205 for better performance.

Power path C 212 may comprise of a voltage controlled switch 318 between node 109 and node 107, and a diode 316 with its anode connected to node 109 and cathode connected to node 107. Diode 316 may be a general semiconductor diode, or a Schottky diode with reduced forward voltage drop, or any other devices configured to have a typical characteristic of a diode. If neither the high power supply 102, nor the restricted power supply 104 is available, the switch 318 should be on, and the system load 110 is powered by the battery 108 through switch 318. During the transitions from battery to restricted power supply, the aforementioned switches are driven following the Brake-Before-Make (BBM) or Make-Before-Brake (MBB) procedures. If the battery voltage is higher than a predetermined value when the transition is initiated, the BBM procedure should be used; the switch 318 should be made off right away, and the switch 310 driven gradually to limit the current through it before being made fully ON to prevent an abnormal charging current into the battery 108; the system load 110 should be powered by the battery 108 through the conducting diode 316 until the restricted power supply take on it the load. If the battery voltage is lower than the limit, the MBB procedure have to be used; the switch 318 remains ON until the restricted power supply is fully connected through the ON switch 310, assuring the system power integrity. In this case a limited current will reach the battery, but charging integrity may be maintained since the battery voltage may be far below its maximum limit.

Figure 4:
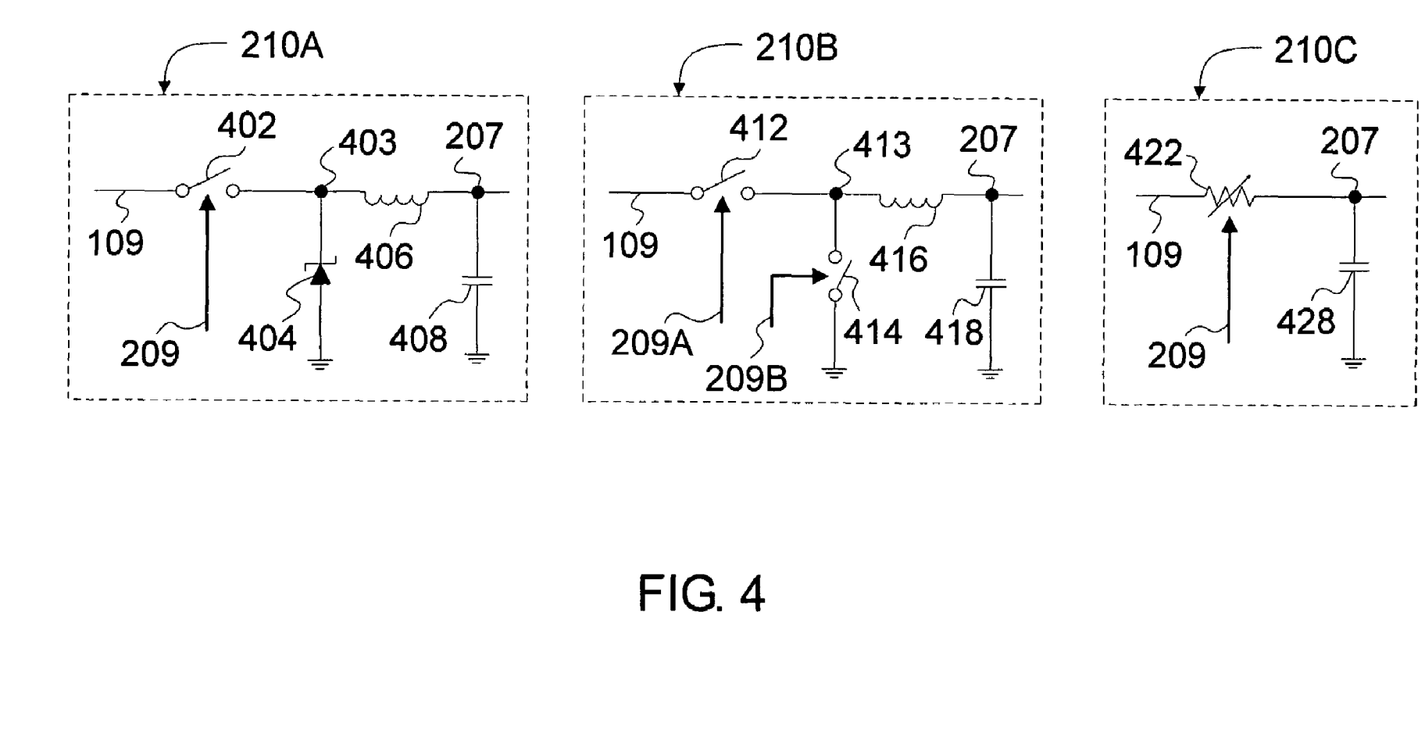
FIG. 4 is a diagram illustrating exemplary charger path circuitry.

Charger path 210 may be used to conduct the charging current from the system line 109 to node 207, then through resistor 214 into the battery 108. In at least one embodiment, the charger circuitry 206 may select at least one charging mode, among a plurality of charging modes, to charge a rechargeable battery 108. In an exemplary embodiment, charger circuitry may select between a switch mode and linear mode. Accordingly, charger path 210 may comprise different circuitry, depending on the operating mode of the charger circuitry 208. The schematic representation of exemplary embodiments of the charger path 210 is shown in FIG. 4, where 210A may include an asynchronous buck converter type charger for switch mode, 210B may include a synchronous buck converter type charger for switch mode, and 210C may include a variable resistor type charger for linear mode.

In the asynchronous buck 210A, a switch 402 controlled by node 209, may be connected between node 109 and node 403. A diode 404 may be connected between node 403 and ground, with its positive terminal tied to ground. An inductor 406 may be connected between node 403 and node 207, and a capacitor 408 may be connected between node 207 and ground. In the operation, switch 402 is periodically switched on/off, as controlled by controller 206 via control signal at node 209, thereby generating switch mode power to one or more rechargeable batteries 108.

In the synchronous buck 2101B, a switch 412 controlled by node 209A, may be connected between node 109 and node 413. Another switch 414 controlled by node 209B, may be connected between node 412 and ground. An inductor 416 may be connected between node 413 and node 207, and a capacitor 418 may be connected between node 207 and ground. During normal charging of the battery 108, switch 412 and switch 414 may be controlled so that they are not on at the same time. To that end, and in this embodiment, charger controller 206 may be capable of generating control signals at nodes 209A and 209B in a manner such that switches 412 and 414 do not conduct simultaneously.

In the variable resistor type charger path 210C for the linear mode, a variable resistor 422 may be connected between node 109 and node 207. The resistance of the variable resistor 422 may be controlled by a control signal generated by charger controller circuitry 206 at node 209. A capacitor 428 may be connected between node 207 and ground, although it is equally contemplated that in this embodiment the capacitor 428 may be omitted. In operation, by adjusting the resistance of the resistor 422, the amount of charging current delivered to battery 108 may be controlled to permit, for example, that battery to be charged while maintaining current to the system load 110.

The variable resistor and the any of the switches described herein may include the same type of devices, such as the bipolar junction transistor (BJT), the isolated gate bipolar transistor (IGBT), and the metal-oxide semiconductor field effect transistor (MOSFET), or any other kind of controlled devices.

Figure 5:
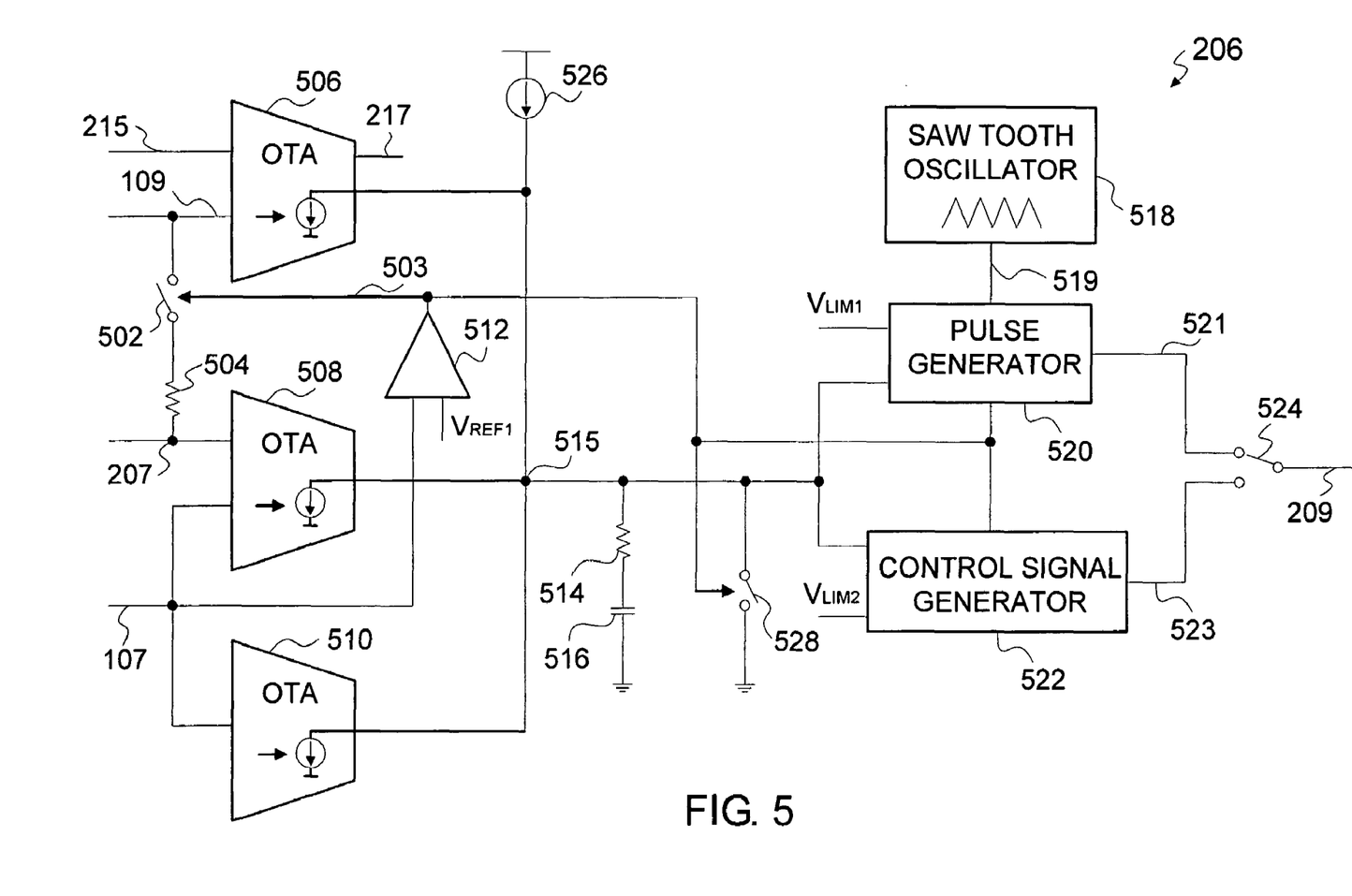
FIG. 5 is a diagram illustrating exemplary charger controller circuitry.

A schematic representation of one embodiment of charger controller circuitry 206 is depicted in FIG. 5. A switch 502, controlled by a control signal at node 503, and a resistor 504 may be connected in series between the system power line 109 and node 207. A comparator 512 may be included to compare the battery voltage at node 107 and a reference voltage $V_{REF1}$, and may also generate the control signal at node 503. If the battery voltage is less than a set minimum voltage, switch 502 may be closed by the control signal at node 503. This control signal may also be used to turn pulse generator circuitry 520 and control signal generator circuitry 522 OFF, and to pull voltage at node 515 to ground through the turned-on switch 528.

Referring again to FIG. 2, a "wake-up phase" may include a situation in which the charging current flows from the system power line 109 through charger controller 206 to node 207, then into the battery 108 directly via the resistor 214. In the wake-up phase, charging current (delivered through charging path 210) may be determined by the resistance of the resistor 504 (FIG. 5).

Referring again to FIG. 5, in the constant current phase or constant voltage phase, switches 502 and 528 may be off. The node 515 gets a constant current from the source 526, while OTA (operational transconductance amplifier) circuitry 506, 508 and/or 510 may be sinking current from the same node. If the voltage difference between node 215 and node 109, which may be proportional to the input currents, reaches a predetermined value, OTA 506 may operate to generate a current to discharge node 515. Otherwise the internal discharging current source in OTA 506 may be disabled. The signal at node 217 may be proportional to the input current, and it may be sent to power source selector 208. If the voltage difference between node 207 and node 107, which may be proportional to the charging currents, reaches a predetermined value, OTA 508 may operate to generate a current to discharge node 515. Otherwise the internal discharging current source in OTA 508 may be disabled. If the voltage at node 107, which may be the battery voltage or a function of the battery voltage, reaches a predetermined value, OTA 510 may operate to generate a current to discharge node 515. Otherwise the internal discharging current source in OTA 510 may be disabled.

Saw tooth oscillator circuitry 518 and pulse generator circuitry 520 may be used to generate a pulse signal at node 521, and the pulse signal may have a selected duty cycle for switch mode charging. The duty cycle may be determined by the comparison result of the voltage at node 515 with the saw tooth signal at node 519. The higher the voltage at node 515, the higher the duty cycle may be. Here the duty cycle refers to the ratio between the time when switch 402 or 412 is on and the total time of one period. When the voltage at node 515 is less than a predetermined value $V_{LIM1}$, the duty cycle of the output pulse at node 521 may be approximately zero, thus the charging current may be approximately zero.

Control signal generator circuitry 522 may be used to generate an analog signal at node 523 for linear mode charging. This signal at node 523 may be determined by the value of the voltage at node 515, and may be used to adjust the resistance of the variable resistor 422 and thus, the charging current. When the voltage at node 515 is less than a predetermined value $V_{LIM2}$, the output signal on node 521 may operate to set the resistance of the variable resistor 422 to an extremely large value, thus the charging current may be approximately zero.

When the charger is in wake-up phase, the voltage at node 515 may be discharged to ground. If it is required to charge the battery in a constant current or a constant voltage phase, the voltage at node 515 may be charged up gradually from zero due to the finite charging time of capacitor 516. The charging current may stay near zero until the voltage at node 515 is higher than $V_{LIM1}$ or $V_{LIM2}$, and the charging current may increase slowly to the target value (this may be true even the voltage at node 515 is higher than $V_{LIM1}$ or $V_{LIM2}$.) This soft-start charging procedure may operate to prevent inrush charging current into the battery, and may protect the battery from damage.

The resistor 514 and the capacitor 516 may used to keep the feedback loop stable, and the resistance and capacitance may differ for the switch mode and linear mode.

A "constant current charging phase" may include the condition when the charging current reaches its predetermined maximum value and OTA 508 may determine and stabilize the voltage at node 515. If the system load needs more current, and the total input current reaches its preset value, OTA 506 may cause the voltage at node 515 to decrease, thus the charging current may be adjusted automatically to its maximum permitted value. When the battery voltage reaches the target value, charging may be accomplished using a "constant voltage phase". During a constant voltage phase, in order to prevent over-voltage of the battery, OTA 510 may cause the voltage at node 515 to decrease. The charging current may adjusted automatically at its permitted maximum value to keep battery voltage stabilized at its target value.

Switch 524 may couple the appropriate signal to node 209 to control the charger path 210. For example, for switching mode charging, the signal at node 521 may be coupled to node 209, while for linear mode charging, the signal at node 523 may be coupled to node 209.

Figure 6:
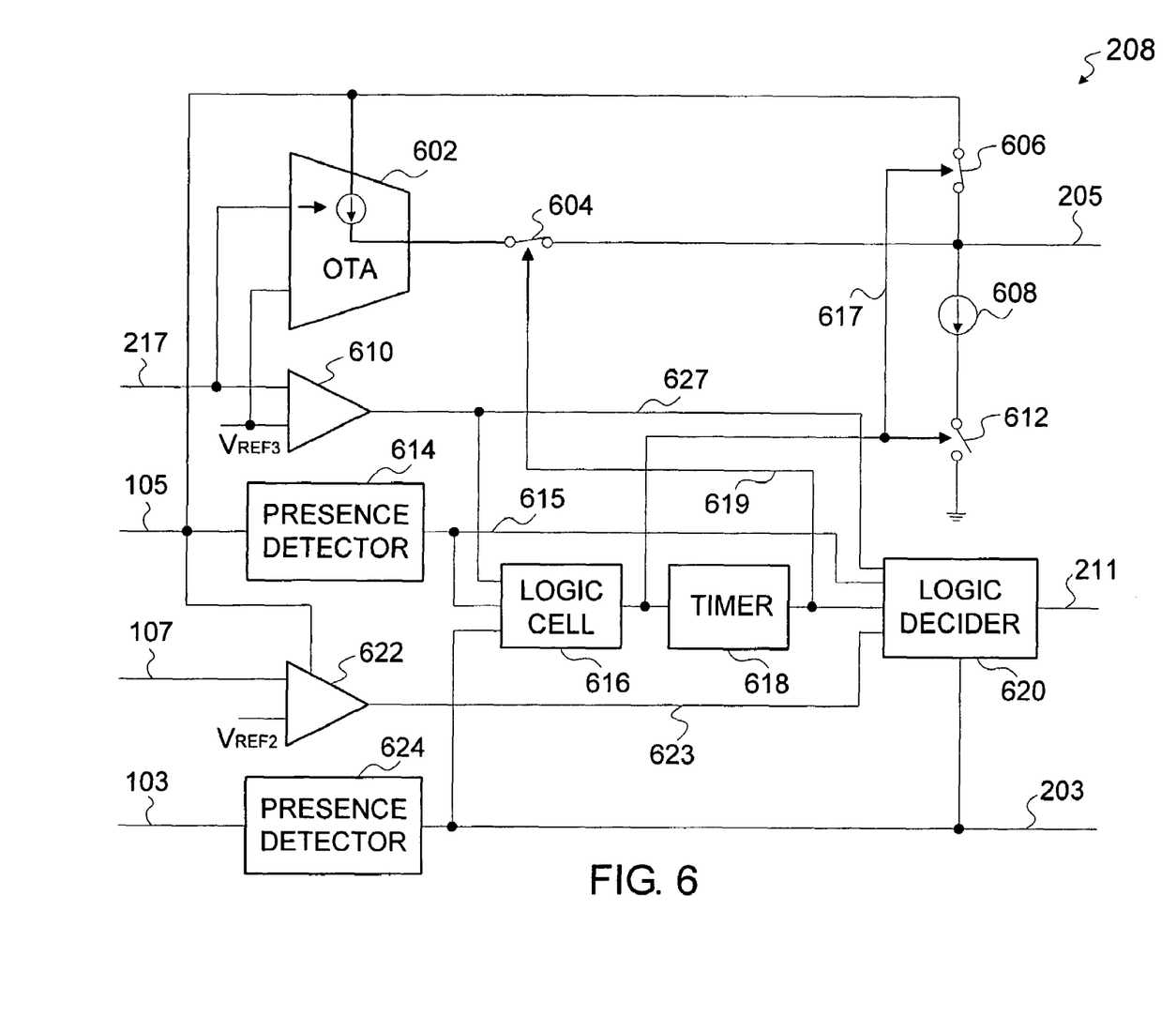
FIG. 6 is a diagram illustrating exemplary power source selector circuitry.

An exemplary schematic of one embodiment of the power mode selector circuitry 208 is depicted in FIG. 6. Selector 208 may include a presence detector 624, which may receive one or more signals at node 103 from the high power supply 102, and may determine whether if a high power supply 102 is present or not and/or has the expected characteristics or not. If the high power supply 102 is present, the signal on node 203 may turn power path A 202 on. The signal on node 203 may also be connected to the logic block 620, which may receive information about the other power supplies (e.g., 104), and based on this information block 620 may generate a signal to control conduction state of power path C 212. A presence indication signal at node 203 may cause the signal at node 211 to block power path C 212. The signal at node 203 may also be coupled to logic cell 616, which may control the output of the node 617.

Comparator 622 may compare the battery voltage at node 107 with a predetermined value $V_{REF2}$ and may also provide an indication signal at node 623. Presence detector 614 may sense the restricted power supply 104 at node 105, and may provide a presence indication signal of the restricted power supply 104 at node 615. Comparator 610 may compare the signal at node 217, which may be proportional to the input current, with a predetermined value $V_{REF3}$ to generate a signal at node 627 indicating if the input current is over a predetermined limit.

Logic cell 616 may operate to drive the node 617 based on the input current status signal at node 627, the presence status signal of the restricted power supply 104 at node 615, and the presence status signal of the high power supply 102 at node 203. If the high power supply 102 is not present, and the restricted power supply 104 is present, and no restriction related to power supply 104 is violated, the logic cell 616 may provide a signal at node 617 indicating that the restricted power supply 104 can be used. This may operate to drive switches 606 and 612 out of synchronization. Switches 606 and 612 may operate to make node 205 fast ramping to high, or ramping down with a controlled slope to control, so that path B 204 moves from a quickly off conduction state to smoothly ON conduction state. This signal (node 617) may also be sent to the timer 618 which may set a transition time for path B. Since the default state of the switch 604 may be on, at the beginning of the restricted power supply 104 plug-in, its input current may limited by resistor 308 at a lower value than the maximum rating current of the power supply 104. The amplifier OTA 602 in conjunction with the current source 608 may drive node 205, which is the driving signal of the restricted power supply path B 204, to decrease slowly to the equivalent resistance of the path B 204. The current delivered from the restricted power supply 104 and the indicative signal 217 may start to increase. When the input current reaches a limit value set by $V_{REF3}$, OTA 602 may operate to inject more current into node 205, actively stabilizing the resistance of the path 204, thus limiting the current. After a time period defined by timer 618 (which may be defined as sufficient to allow the system to settle), the signal at node 619 may turn switch 604 off, and the discharging current of current source 608 may eventually pull the voltage at node 205 to ground, turning the switch 310 fully on.

Logic block 620 may generate a control signal at node 211 to control the conduction state of power path C 212. To assure power integrity during a switch among different power inputs, the signal at node 211 may turn switch 318ON to make the battery ready for powering the system load 110 if neither the high power supply 102 nor the restricted power supply 104 is present, as indicated by the signals at nodes 203 and 615 respectively.

If high power supply 102 is not present, as indicated by the signal at node 203, and the restricted power supply 104 is present, as indicated by the signal at node 615, and the battery voltage at node 107 is less than the threshold voltage $V_{REF2}$ as indicated by the signal at node 623, and it is in the soft-start procedure as indicated by the signal at node 619, in this case, there may be a limited charging current flowing into the battery through the conducting switch 318. Since the battery voltage may be smaller than $V_{REF2}$, and $V_{REF2}$ may be smaller than the maximum voltage of the battery, this charging current may be within acceptable safety limits for the battery.

If high power supply 102 is not present, as indicated by the signal at node 203, and the restricted power supply 104 is present, as indicated by the signal at node 615, and an over-current event for the restricted power supply 104 occurs, as indicated by the signal at node 627, the power source selector 208 may operate as follows: if the battery voltage is larger than $V_{REF2}$ during the soft-start procedure of the restricted power supply 104, switch 318 may be turned off immediately by the signal at node 211 to prevent an abnormal over-charging current. At this time the system load may be powered from the battery via the forward conducting diode 316.

Figure 7:
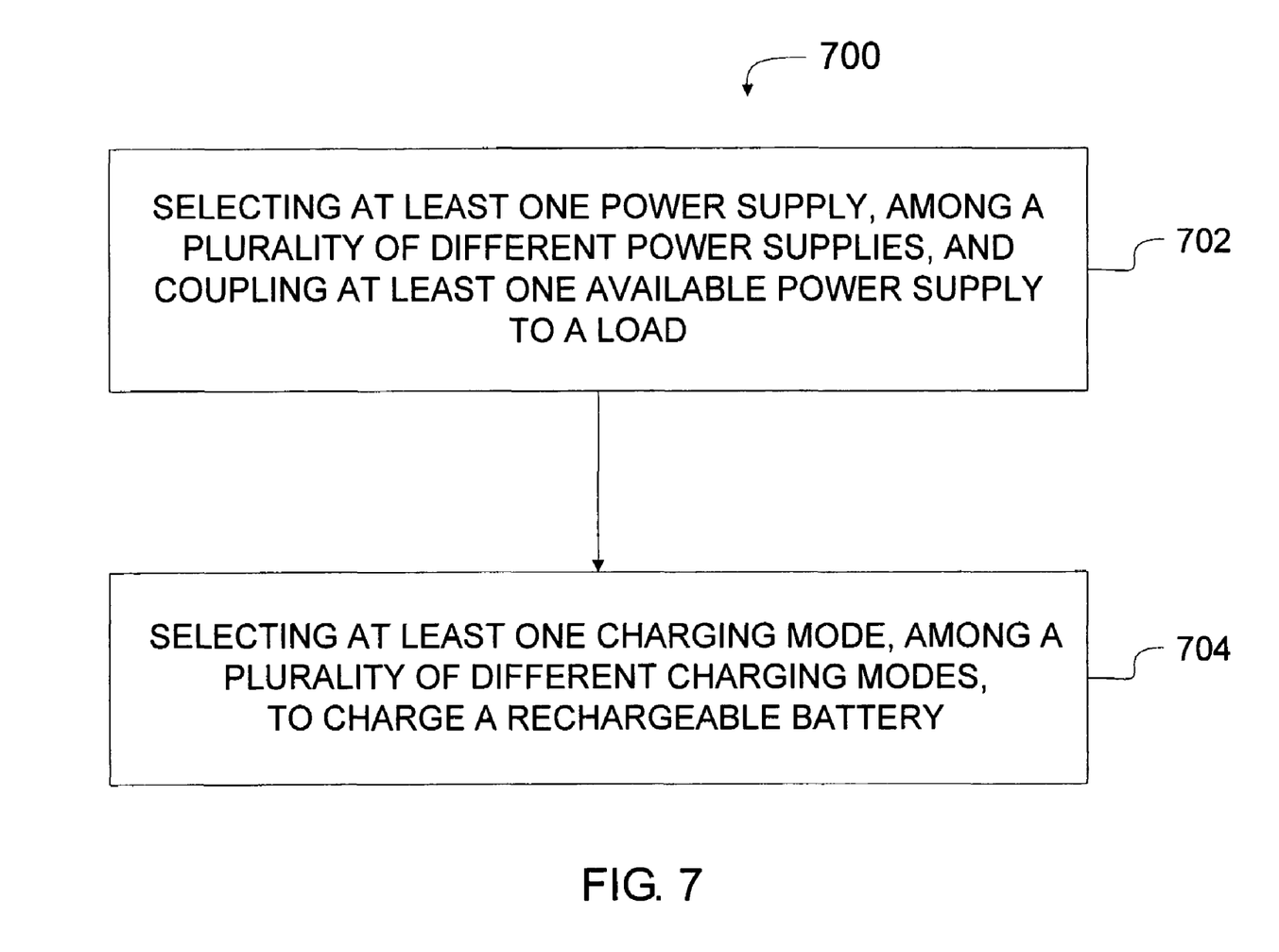
FIG. 7 is a flowchart of exemplary operations according to an embodiment.

FIG. 7 depicts a flowchart 700 of exemplary operations which may be performed according to an embodiment. Operations may include selecting at least one power supply, among a plurality of different power supplies, and coupling at least one available power supply to a load 702. Operations may also include selecting at least one charging mode, among a plurality of different charging modes, to charge a rechargeable battery 704.

Thus, in summary, an apparatus embodiment provided herein may include an integrated circuit that may be capable of selecting at least one power supply, among a plurality of different power supplies, and coupling at least one available power supply to a load. The integrated circuit may also be capable of selecting at least one charging mode, among a plurality of different charging modes, to charge a rechargeable battery.

Advantageously, the embodiments described herein may provide high performance power management for an electronic device. Moreover, certain embodiment described herein may be capable of receiving power from high power supplies, restricted power supplies, and/or batteries. Other advantages may include powering the system load and charging the battery at the same time. In exemplary embodiment, the integrated circuit can provide two charging modes: switch mode and linear mode. The integrated circuit may also provide, for example, three different charging phases: wake-up phase, constant current phase, and constant voltage phase. The charging current can be adjusted automatically to firstly fulfill the system requirement, and allocating all remaining available power to charge the battery in order to provide a fast battery charging time. Further, the integrated circuit may be capable of selecting power inputs automatically according to their status to ensure safety of the power supplies, the system load and/or one or more rechargeable batteries.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
   a power source selector coupled to a plurality of different types of power supplies and to a rechargeable battery, said power source selector operable for selecting and electrically coupling a power supply of said plurality to a load and to said battery to both deliver power to said load and charge said battery, said selecting in response to a plurality of presence signals indicating presence of said plurality of different power supplies and in response to a current information signal indicating an input current flowing from said power supply; and
   a charger controller coupled to said power source selector and operable for generating said current information signal and for selecting a charging mode from at least a switch mode and a linear mode to charge said battery, wherein said charger controller is also operable for controlling a duty cycle of a pulse signal and a level of a linear control signal according to said plurality of presence signals and said current information signal, thereby controlling a charging power to said battery in said switch mode and said linear mode.

2. The apparatus of claim 1, wherein said charger controller is further operable for selecting a charging phase from a plurality of different charging phases to charge said rechargeable battery.

3. The apparatus of claim 2, wherein said plurality of different charging phases is selected from the group consisting of a wake-up phase, a constant current phase, and a constant voltage phase.

4. The apparatus of claim 1, wherein said plurality of power supplies comprises a high power supply capable of delivering an instantaneous power to said load.

5. The apparatus of claim 1, wherein said plurality of power supplies comprises a restricted power supply capable of delivering a restricted power to said load.

6. The apparatus of claim 1, wherein said plurality of power supplies comprises said rechargeable battery capable of delivering power to said load.

7. The apparatus of claim 1, wherein said charger controller is further operable for allocating power to said load and allocating any remaining power to said battery according to said plurality of presence signals and said current information signal.

8. A method comprising:
receiving a plurality of presence signals indicating the presence of a plurality of different power supplies;
generating a current information signal indicating an input current flowing from at least one available power supply;
selecting a power supply from said plurality of different power supplies and electrically coupling said power supply to a load and to a rechargeable battery in response to said plurality of presence signals and said current information signal to both deliver power to said load and charge said battery;
selecting a charging mode from at least a switch mode and a linear mode to charge said battery;
controlling a duty cycle of a pulse signal and a level of a linear control signal according to said plurality of presence signals and said current information signal; and
controlling a charging power to said battery in said switch mode and said linear mode according to said pulse signal and said linear control signal respectively.

9. The method of claim 8, further comprising selecting a charging phase from a plurality of different charging phases to charge said rechargeable battery.

10. The method of claim 9, wherein said plurality of different charging phases is selected from the group consisting of a wake-up phase, a constant current phase, and a constant voltage phase.

11. The method of claim 8, wherein said plurality of power supplies comprises a high power supply capable of delivering an instantaneous power to said load.

12. The method of claim 8, wherein said plurality of power supplies comprises a restricted power supply capable of delivering a restricted power to said load.

13. The method of claim 8, wherein said at plurality of power supplies comprises said rechargeable battery capable of delivering power to said load.

14. The method of claim 8, further comprising allocating power to said load and allocating any remaining power to said rechargeable battery according to said plurality of presence signals and said current information signal.

15. A system comprising:
a portable electronic device comprising an integrated circuit and a load and coupled to a plurality of different types of power supplies and to a rechargeable battery, said integrated circuit operable for receiving a plurality of presence signals indicating the presence of said plurality of different power supplies and for generating a current information signal indicating an input current flowing from at least one available power supply, said integrated circuit further operable for selecting a power supply from said plurality of different power supplies and electrically coupling said power supply to both said load and said battery in response to said plurality of presence signals and said current information signal, said integrated circuit further operable for selecting a charging mode from at least a switch mode and a linear mode to charge said battery, said integrated circuit further operable for controlling a duty cycle of a pulse signal and a level of a linear control signal according to said plurality of presence signals and said current information signal, thereby respectively controlling a charging power to said battery in said switch mode and said linear mode.

16. The system of claim 15, wherein said integrated circuit is further operable for selecting a charging phase from a plurality of different charging phases to charge said rechargeable battery.

17. The system of claim 16, wherein said plurality of different charging phases is selected from the group consisting of a wake-up phase, a constant current phase, and a constant voltage phase.

18. The system of claim 15, wherein said plurality of power supplies comprises a high power supply capable of delivering an instantaneous power to said load.

19. The system of claim 15, wherein said plurality of power supplies comprises a restricted power supply capable of delivering a restricted power to said load.

20. The system of claim 15, wherein said plurality of power supplies comprises said rechargeable battery capable of delivering power to said load.

21. The system of claim 15, wherein said integrated circuit is further operable for allocating power to said load and allocating any remaining power to said battery according to said plurality of presence signals and said current information signal.

22. The system of claim 15, wherein said portable electronic device is selected from the group consisting of a laptop computer, a portable phone, a digital still camera and a digital movie camera.

23. The system of claim 15, wherein said load comprises an active electronic circuit capable of receiving power from said power supply.

24. The apparatus of claim 1, wherein said charger controller comprises:
a plurality of amplifiers coupled to said plurality of power supplies operable for receiving said plurality of presence signals and for generating a plurality of control signals and said current information signal according to said plurality of presence signals;
an oscillator operable for generating said pulse signal;
a pulse generator coupled to said plurality of amplifiers and said oscillator operable for controlling said duty cycle of said pulse signal according to said plurality of control signals and said current information signal; and
a linear controller coupled to said plurality of amplifiers operable for controlling said level of said linear control signal according to said plurality of control signals and said current information signal.

* * * * *